United States Patent [19]

Hinkley et al.

[11] Patent Number: 5,000,639
[45] Date of Patent: Mar. 19, 1991

[54] SELF-THREADING BOLT

[75] Inventors: Lewis P. Hinkley, Virginia Beach, Va.; Paul B. Elswick, Kingsport, Tenn.

[73] Assignee: Paul B. Elswick, Kingsport, Tenn.

[21] Appl. No.: 300,848

[22] Filed: Jan. 24, 1989

[51] Int. Cl.⁵ ............................................. F16B 35/04
[52] U.S. Cl. ..................................... 411/418; 411/386
[58] Field of Search .............................. 411/417–420, 411/386, 387, 426

[56] References Cited

U.S. PATENT DOCUMENTS

| 2,093,171 | 9/1937 | Olson | 411/418 |
| 2,093,172 | 9/1937 | Olson | 411/420 |
| 2,165,010 | 7/1939 | Rosenberg | 411/420 |
| 2,278,411 | 4/1942 | Braendel | 411/386 |
| 2,572,647 | 10/1951 | Merwin | 411/418 |
| 2,823,574 | 2/1958 | Rosan | 411/418 |

Primary Examiner—Neill R. Wilson
Attorney, Agent, or Firm—Staas & Halsey

[57] ABSTRACT

A self-tapping and threading bolt to replace bolts when the bolt holes have damaged or stripped threads. The self-tapping bolt has a self-tapping tapered end which is small enough to fit in the bolt hole into which it is inserted. It has two slots cut into the end which provides both channels for disposal of chips and to define the cutting edge of the self-tapping portion. The cutting edge of the self-tapping portion is decreased in radius behind the cutting edge to provide a relief so that the bolt can be turned with less torque into the damaged bolt hole.

12 Claims, 1 Drawing Sheet

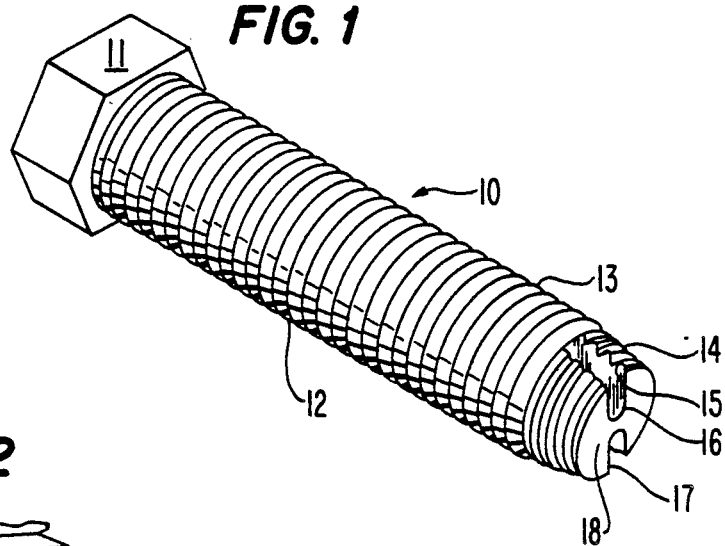
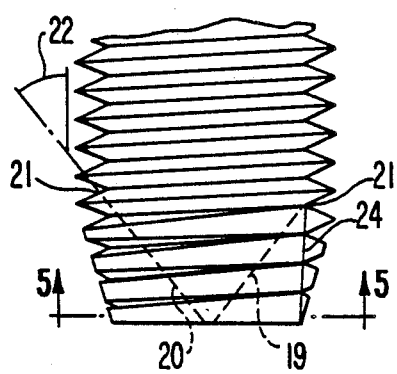
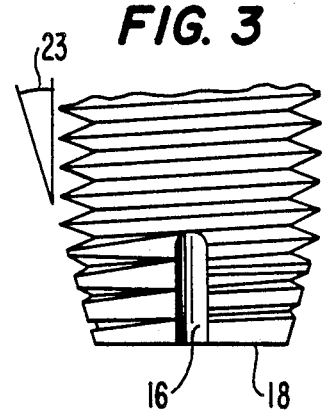
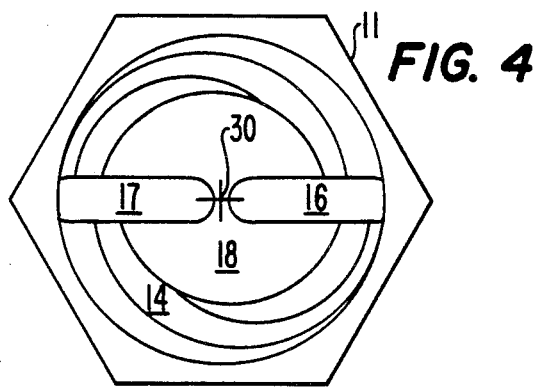
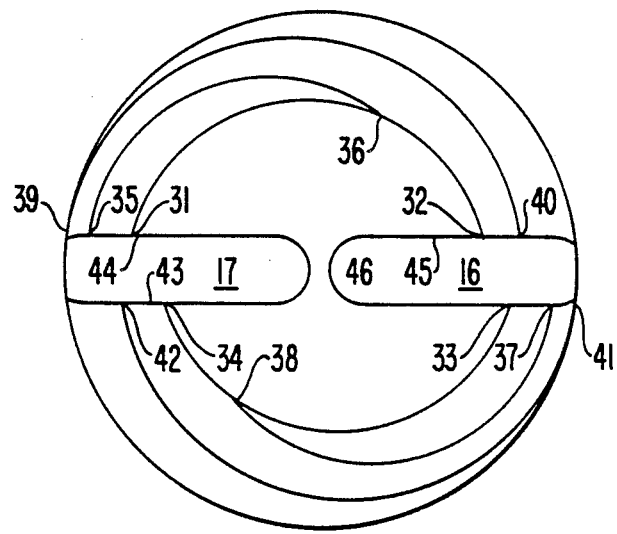
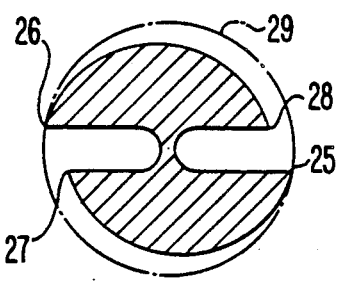

SELF-THREADING BOLT

This invention relates to self-tapping fasteners and especially to bolts that are capable of recutting a damaged screw thread during installation in a threaded opening.

Stripped out bolt holes in machinery can be a major expense primarily because of the equipment in which the bolt hole is located may be unusable until it is repaired and the down time of the equipment until such repair takes place can oftentimes give rise to significant economic losses.

A stripped out bolt hole usually presents only four options for correction.

The first option is to take apart the machine or device in which the bolt hole is stripped and take the component that contains the stripped out hole to a machine shop where the hole is filled with weld then redrilled, retapped and the original bolt is replaced with a bolt of the same size.

A second option is to drill the hole to a standard uniform larger size, retap it with an oversize tap and put an oversize bolt into the new hole. One drawback to this technique is that there may be insufficient metal around the hole to allow drilling to the next standard size.

A third option is to drill the hole to a somewhat larger but not standard size and install a helical coil or threaded insert into the new hole into which a new bolt is threaded. This requires a special drill, a special tap and a special helical coil or threaded insert.

The fourth option for repairing a stripped bolt hole is to use special epoxy cement. Any grease or oil or similar materials can effect the useability of this technique which is basically the use of an adhesive to put the bolt back into the hole.

Other techniques have been suggested for use from time to time but is believed that the above four options are the main ones actually available.

The bolt of the present invention is used in the damaged hole without any preparation. There is no drilling or resizing or the use of special tools required. A new special self-tapping bolt made in accordance with the invention is substituted for the original bolt and as it is screwed into the hole having the damaged threads, it cuts new threads to a slightly larger diameter and provides new threads at the same pitch as the original threads. The newly cut slightly larger threads removes any irregularities in the damaged hole.

While this general approach has been suggested in the patent literature before, it is believed that prior devices suffer from one or more deficiencies. Primarily, these deficiencies are an inability to adequately accommodate the metal cuttings created during the tapping process and the excessive torque required in turning the self-tapping bolts as they cut the new threads in the damaged hole.

The present invention has solved these previous deficiencies. The present invention is able to cut its own threads in a variety of base materials and do that in a hole that has as much as ⅔rds or more of the original threads left to holes as large as a hole with no threads at all. It can have the holding power of a standard SAE grade 8 bolt. The chips created by the thread cutting are cleared away from the cutting edges and allows a variety of base metal thicknesses. The self-tapping part of the bolt preferably is the first five threads so there is no substantial sacrifice of the bolt length. The torque required for insertion permits a relatively easy insertion and is well within the torsional strength of the bolt.

Basically, the bolt is a self-tapping fastener whose circular shank has a bolt head or other device at one end to which a turning torque can be applied as it is screwed into the damaged bolt hole. At the other end, is a self-tapping section which is tapered so that the smallest end diameter is small enough to be inserted into the damaged hole. The self-tapping portion is relatively small in length and preferably is approximately 5 threads long based on the U.S. National Coarse Thread Standard or an equivalent if other threads are used. This is sufficient to do the tapping but at the same time does not subtract substantially from the useable bolt length. The tapered self-tapping portion merges into the screw threads which extend up the length of the shank to the desired height (or threaded portion length).

In repairing a bolt hole, the screw threads are the same pitch as those of the original hole but are slightly deeper so as to tap into new material so that the holding power of the new oversize bolt or fastener can retain the original holding power.

The tapered self-tapping end has preferably two slots cut into the end along a plane that includes the axis of the bolt. These slots extend from the outer wall of the shank at the beginning of the taper down to the center of the end face of the bolt which is usually relatively flat. This slot serves to dispose of chips created during the tapping operation and one wall of the two walls of the slot serves to define the cutting edge which is the leading part of the tapping thread. This cutting or leading edge of the thread is a maximum diameter of the tap at that point and just behind this cutting edge the radius starts to decrease until the thread again encounters a slot. This relief of the cutting thread or decreasing radius is of critical importance as it substantially reduces the torque needed to insert the bolt during the initial self-tapping operation.

While preferably two grooves or slots are utilized 180° from one another, a single slot could also be used and in the case of some larger bolts, more than two slots may be used although two are still preferred.

Because of the taper, each successive cutting edge of the self-tapping portion is of increasing diameter and takes an additional small cut of metal from the threads being tapped. Thus, using two slots and five threads in the self-tapping section, there would be ten cutting edges of increasing diameter so that each sequential cutting edge only takes a small bite at the metal. This multiple bite also reduces the torque necessary to install the bolt the first time in a damaged hole.

As mentioned, the reduced radius of the self-tapping thread just behind the cutting edge provides a critical relief for the bolt and is in large measure responsible for the success of the bolt.

While the inventors do not wish to be held to their theory, it is believed that in the absence of such relief, turning the bolt would be like driving a wedge into a hole. There would be immediately some wear on the cutting edge or some slight deformation of the metal at the cutting edge so that the trailing edge, if of the original diameter, would be higher than the leading edge and would tend to jam. The decreasing radius starting immediately behind the cutting edge has solved this problem.

Thus, there is provided a self-tapping bolt or fastener which can be inserted into a bolt hole in which some of the threads have been bruised or stripped which will deepen the existing threads or cut new threads and then remain in the hole as a fastener.

The advantages and novel features of the invention, as well as its capabilities, will be understood with reference to the following drawings and detailed description.

IN THE DRAWINGS

FIG. 1 shows a perspective view of the preferred embodiment of the invention;

FIG. 2 is a partial side view of the tapered self-tapping end of the bolt of FIG. 1 showing the bottom of the slots by dotted-lines;

FIG. 3 is a partial side view similar to FIG. 2 except rotated 90° so that it views the width of one of the slots;

FIG. 4 is an end view of the bolt taken from the self-tapping tapered end and showing only three cutting threads for purposes of clarity;

FIG. 5 is a cross-section of FIG. 2; and

FIG. 6 is one enlarged schematic view similar to FIG. 4 with the bolt head omitted.

With reference to FIG. 1, there is shown a bolt 10 having a hexagonal head 11, a circular shank 12 which has a threaded section 13 and a tapered tapping end section 14. The end section includes self-cutting tapping threads 15, slots 16 and 17 and an end face 18.

With reference to FIG. 2, there is shown a partial side view of the end of the bolt of FIG. 1 with the bottom of the slots 16 and 17 shown in dotted lines. As is seen from FIG. 2, the bottom 19 of slot 16 and the bottom of slot 17 both start at approximately the center of the end face 18 and slope outwardly until they emerge from the side of the bolt at 21 which is in the vicinity where the tapered tapping end section 14 terminates and merges into the threaded section 13. The angle of the bottom of the slot as measured from the axis of the bolt is known as the slot angle (SA) and is shown at 22 in FIG. 2.

With reference to FIG. 3, there is shown a view similar to FIG. 2 except rotated 90° so that a side view of slot 16 is presented showing the slot width (SW). FIG. 3 also shows the bevel angle (BA) 23. This is the angle of taper to which the tapered tapping end section 14 of the bolt is formed usually by cutting or grinding.

It has been found that the tapered tapping end section should be 4 to 6 threads long based on the U.S. National Course (UNC) thread standard or similar length in other standards such as the U.S. National Fine (UNF) standard. It has been found that less than 4 threads in the tapered tapping end section are less efficient in providing the initial cutting action for the tapered tapping end section and more than 6 threads is counterproductive since the extra cutting edges usually are not needed and use up the length of the threaded section of the bolt. It is preferred to have the tapered tapping end section cover 4 to 6 threads and preferably 5 threads based on the UNC standards or a similar length on other standards.

The tip diameter (TD) of the bolt is the diameter of the end face 18 which is approximately the diameter of the bolt as measured to the root of the threads as shown by line 24 in FIG. 2. Basically this TD should be small enough to install into the least damaged hole in which it is anticipated that the device will be used. The tip has to be small enough to go into the hole so that the first cutting edges can grab into the metal and start cutting threads. Usually this is considered to be a hole in which the top third of the thread has been stripped. The self-tapping bolt is slightly oversized as compared to the bolt which it normally replaces.

The bolt of the invention has two grooves or slots 16 and 17 which are opposite each other and in the same geometric plane which passes through the longitudinal axis of the bolt. They are symmetrical on either side of the center of the bolt or the bolt's longitudinal axis. One slot may be used and on larger bolts more than two slots may be used. However, it has been found that two slots are the most satisfactory.

The slots have two functions. The first function is to create a cutting edge using the cross-sections of the threads. The cutting edge is the leading edge of the slot as the bolt is turned into a hole and the side of the slot and a cross-section of a thread forms a cutting edge which, on the face where the slot and thread meets, is a sharp cutting area. A second function of the slot is that it permits the freshly cut chips to be removed so that as these chips are generated by being cut out of the material that the bolt is being tapped and screwed into, the chips are removed and pushed forward of the bolt and away from the cutting edge.

With reference to FIG. 5 which is a schematic cross-section 5—5 of FIG. 2, there is shown how the cutting edges or leading edges 25 and 26 are relieved by being formed so that the radius becomes increasingly smaller behind the cutting edges until the trailing edges 27 and 28 are reached. Thus, the leading or cutting side of the groove as it is turned into a hole provides a leading or cutting edge with the opposite side of the groove or slot being a non-cutting or trailing side. This is critical to the invention because if this relief or decreasing radius, as measured from the longitudinal axis of the bolt, from the cutting edge to the trailing edge is not provided, the bolt will wedge into the hole requiring an inordinate torque during the self-tapping function. It is speculated that this is because the cutting edge will immediately be slightly worn and there will probably be some slight deformation of the cutting threads. While this would be very slight, it would substantially increase the torque required to turn the bolt as it in effect is wedging the bolt cutting threads into the hole. The diameter of the cutting edge in FIG. 5 is shown at 29 and the amount of relief provided by the decreasing radius behind the cutting edges can be readily seen. Such decreasing radius does not have to be very large, but it is critical that it be provided.

With reference to FIG. 4, there is shown a schematic end view of the bolt looking at the end face 18. For ease of illustration, only three cutting threads are shown. The hexagonal head 11 is shown as well as the bolt's longitudinal axis 30, slots 16 and 17, and the tapered tapping end section 14.

FIG. 6 is an enlarged view of FIG. 4 with the hexagonal head omitted. The slot 17 has a cutting or leading side or face 44 and a non-cutting or trailing side or face 43. Slot 16 has a cutting or leading face or side 46 and a non-cutting or trailing side or face 45. The first cutting or leading edge to bite into the metal of the hole is 31 and its trailing or non-cutting edge 32 is of less radius than the cutting edge 31. The second cutting edge 33 is of slightly larger radius than cutting edge 31 and is followed by trailing or non-cutting edge 34 which is of smaller radius than cutting edge 33. The third cutting edge 35 is of still slightly larger radius than cutting edge 33 and is followed by trailing or non-cutting edge 36 which is of smaller radius than cutting edge 35. The fourth cutting edge 37 is of still slightly larger radius than cutting edge 35 and is followed by trailing edge 38 which is of smaller radius than cutting edge 37. It is to be noted that the grinding of the threads at the very end of the bolt and especially in the reduced radius trailing edge areas is down to or past the root of the threads and so the schematic is difficult to depict exactly. However, the amount of relief behind the cutting edges is not critical providing it is sufficiently significant so as to relieve any wedging or binding effect from the cutting edge.

The fifth cutting edge 39 is of slightly larger radius than the radius of cutting edge 37 and is followed by a fifth trailing edge 40 which is again of small radius than the cutting edge 39. The sixth cutting edge 41 is of slightly larger radius than cutting edge 39, although this is not clearly shown in FIG. 6, and is followed by a trailing edge 42 that is of smaller radius than cutting edge 41.

Thus, it is seen from FIG. 6, that in the case of three threads and two slots, there are provided six progressively larger diameter cutting edges. In the case of the a preferred actual bolt with five threads (UNC standard) in the cutting or tapping section, there would be ten cutting edges with two slots. If there were only one slot, there would be five cutting edges and in the case of three slots there would be 15 cutting edges.

It is to be recognized that the trailing edge is ½ pitch further along the taper when two slots are used and that the cutting or leading edge and the trailing edges would be reversed in the case of a left-handed bolt rather than the more common right-handed bolt as shown.

The first cutting edge when first inserted into a hole will take a small bite of the material into which it is being tapped and screwed followed by the second cutting edge taking a similar small bite of the material. This would be progressively done until ten incremental bites have been taken in the case of five threads and two slots. This provides a threaded hole of the diameter of the threaded portion of the bolt and thus provides a perfect fit. Usually cutting oil is used when inserting the bolt as it makes the self-tapping easier especially for larger holes.

Usually the bolts are from approximately ¼ inch through an 1½ inch. Below ¼ of an inch, there are usually self-tapping screws that may be adequate. These screws are different from bolts as they roll threads into the material rather than tapping them and usually the threads are small and widely spaced. Beyond 1½ inches requires a torque that is normally too high for a man to tap threads without mechanical help.

Usually the bolts are made of steel and used with steel structures but the invention can be utilized with other material such as stainless steel bolts for aluminum and so forth. Usually the bolt's stock is AISI 8620 steel which has been quenched and tempered to a core hardness of Rockwell C 28 to C 32. Following the machining of the tapered self-tapping cutting edge, the bolt is case carburized to Rockwell C 60 at full thread depth. This case carburization of the bolt may be modified if desired as it is only necessary for the self-tapping cutting end to have the hardness of C 60. The novel features of the bolt permit a substantial reduction in the torque required for its use. For example, a ⅜ inch bolt using ten cutting edges has been installed using 80 to 90 ft. lbs. maximum torque. Without the features of the invention, it was found that the torque required for a ⅜ inch bolt in some of the experiments was 220 ft. lbs. which was sufficient to crack the case hardening on the bolt and lead to its failure under testing.

After the bolt has been installed, it can be withdrawn and reinstalled into the same hole without any problem. Because of the excellent fit, the installed bolt is more resistant to vibration.

Some of the data on the original fasteners is shown in Table 1 and on replacement bolts is shown in Table 2. The definitions have already been explained above except for the body diameter (BD) of the bolt which is the maximum diameter of the threaded section of the bolt.

TABLE 1

Orignal Fastener Data

| Size | Dec. | TPI UNC | TPI UNF | Thread Hght (TH) UNC | Thread Hght (TH) UNF | Inside Nut Diam. UNC | Inside Nut Diam. UNF |
|---|---|---|---|---|---|---|---|
| ¼ | 0.250 | 20 | 28 | 0.031 | 0.022 | 0.188 | 0.206 |
| 5/16 | 0.313 | 18 | 24 | 0.034 | 0.026 | 0.245 | 0.261 |
| ⅜ | 0.375 | 16 | 24 | 0.038 | 0.026 | 0.299 | 0.323 |
| 7/16 | 0.438 | 14 | 20 | 0.044 | 0.031 | 0.350 | 0.376 |
| ½ | 0.500 | 13 | 20 | 0.047 | 0.031 | 0.406 | 0.438 |
| 9/16 | 0.563 | 12 | 18 | 0.051 | 0.034 | 0.461 | 0.495 |
| ⅝ | 0.625 | 11 | 18 | 0.056 | 0.034 | 0.513 | 0.557 |
| ¾ | 0.750 | 10 | 16 | 0.061 | 0.038 | 0.628 | 0.674 |
| ⅞ | 0.875 | 9 | 14 | 0.068 | 0.044 | 0.739 | 0.787 |
| 1 + 0/8 | 1.000 | 8 | 12 | 0.077 | 0.051 | 0.846 | 0.898 |
| 1 + ⅛ | 1.125 | 7 | 8 | 0.088 | 0.077 | 0.949 | 0.971 |
| 1 + ¼ | 1.250 | 7 | 8 | 0.088 | 0.077 | 1.074 | 1.096 |
| 1 + ⅜ | 1.375 | 6 | 8 | 0.102 | 0.077 | 1.171 | 1.221 |
| 1 + ½ | 1.500 | 6 | 8 | 0.102 | 0.077 | 1.296 | 1.346 |

TABLE 2

Re-Bolt Data

| Size | Bevel Angel (BA) UNC | Bevel Angel (BA) UNF | Slot Angle (SA) UNC | Slot Angle (SA) UNF | Slot Width (SW) UNC | Slot Width (SW) UNF | Tip Diameter (TD) UNC | Tip Diameter (TD) UNF | Body Diameter (BD) UNC | Body Diameter (BD) UNF |
|---|---|---|---|---|---|---|---|---|---|---|
| ¼ | 7 | 7 | 24 | 31 | 0.056 | 0.050 | 0.229 | 0.235 | 0.291 | 0.279 |
| 5/16 | 7 | 7 | 26 | 33 | 0.069 | 0.062 | 0.290 | 0.295 | 0.358 | 0.347 |
| ⅜ | 7 | 7 | 28 | 37 | 0.082 | 0.070 | 0.350 | 0.358 | 0.426 | 0.410 |
| 7/16 | 7 | 7 | 28 | 36 | 0.096 | 0.084 | 0.408 | 0.417 | 0.496 | 0.479 |
| ½ | 7 | 7 | 29 | 40 | 0.108 | 0.091 | 0.469 | 0.479 | 0.563 | 0.541 |
| 9/16 | 7 | 7 | 30 | 40 | 0.121 | 0.102 | 0.528 | 0.540 | 0.630 | 0.608 |
| ⅝ | 7 | 7 | 31 | 43 | 0.134 | 0.108 | 0.588 | 0.602 | 0.700 | 0.670 |
| ¾ | 7 | 7 | 33 | 45 | 0.157 | 0.127 | 0.709 | 0.725 | 0.831 | 0.801 |
| ⅞ | 7 | 7 | 34 | 45 | 0.180 | 0.147 | 0.830 | 0.846 | 0.966 | 0.934 |
| 1 + 0/8 | 7 | 7 | 34 | 45 | 0.206 | 0.171 | 0.949 | 0.966 | 1.103 | 1.068 |
| 1 + ⅛ | 7 | 7 | 34 | 37 | 0.233 | 0.221 | 1.066 | 1.074 | 1.242 | 1.228 |
| 1 + ¼ | 7 | 7 | 36 | 40 | 0.249 | 0.235 | 1.191 | 1.199 | 1.367 | 1.353 |
| 1 + ⅜ | 7 | 7 | 35 | 42 | 0.281 | 0.247 | 1.307 | 1.324 | 1.511 | 1.478 |
| 1 + ½ | 7 | 7 | 37 | 45 | 0.296 | 0.258 | 1.432 | 1.449 | 1.636 | 1.603 |

While the bolt has been set forth primarily as an oversized bolt to replace the damaged thread bolt holes of the same pitch, the bolt may be in the form of a fastener used in other situations where the novel features would be useful.

It is to be understood that the form of the invention herewith shown and described is to be taken as a preferred example of the same and various changes in the shape, size and arrangement of parts may be resorted to without departing from the spirit of the invention or scope of the following claims.

What is claimed is:

1. A self-tapping fastener adapted to cut a complimentary screw thread in a hole, comprising:

a circular shank having a first tapered self tapping end for insertion in said hole, a threaded section adjacent said tapered self tapping end and a second end adapted to having a turning force applied thereto;

said tapered self-tapping end having tapping thereon of the same pitch and approximately the same root diameter as said threads on said threaded section and having a maximum outer diameter the same as and merging with said threaded section with said tapping threads outer diameter decreasing along the taper until it is smaller than said hole at the outermost end of said tapered self-tapping end;

at least one slot lying in a plane passing through the central axis of said shank;

said slot having a bottom and two walls with said bottom tapering outward from near the center of said outermost first end of said shank and inclining outwardly along said shank until it intersects the outer diameter of said shank in the approximate area that the tapered self-tapping section merges with said threaded section;

threads of said tapered self-tapping section being interrupted by said slot so as to define a cutting area where the leading end of said self-tapping threads intersects with said slot and relief trailing end of said self-tapping thread also intersects with said slot; and the radius of said self-tapping thread at said leading end being a maximum radius which substantially decreases behind said leading end until said trailing end is reached to thereby provide a self-tapping fastener that accommodates the chips created by the cutting area of the self-tapping threads that requires less torque to turn due to the substantial relief of the radius behind the cutting end of the self-tapping threads.

2. The self-tapping fastener of claim 1 wherein:
said slot are two in number spaced on opposite sides of said tapered self-tapping end.

3. The self-tapping fastener of claim 2 wherein:
said threads on said tapered self-tapping end are approximately five in number.

4. The self-tapping fastener of claim 3 wherein:
said second end is in the form of a bolt head.

5. A self-tapping bolt adapted to cut a complimentary screw thread in a bolt hole having damaged threads, comprising:

a circular shank having a first tapered self tapping end for insertion in said hole, a threaded section adjacent said tapered self tapping end and a second end having a bolt head adapted to having a turning force applied thereto;

said threaded section having a diameter slightly larger than said bolt hole with the threads of the same pitch;

said tapered self-tapping end having tapping thereon of the same pitch and approximately the same root diameter as said threads on said threaded section and having a maximum outer diameter the same as and merging with said threaded section with said tapping threads outer diameter decreasing along the taper until it is smaller than said hole at the outermost end of said tapered self-tapping end;

at least one slot lying in a plane passing through the central axis of said shank;

said slot having a bottom and two walls with said bottom tapering outward from said outermost first end of said shank and inclining outwardly along said shank until it intersects the outer diameter of said shank in the approximate area that the tapered self-tapping section merges with said threaded section;

threads of said tapered self-tapping section being interrupted by said slot so as to define a cutting area where the leading end of said self-tapping threads intersects with said slot and relief trailing end of said self-tapping thread also intersects with said slot; and the radius of said self-tapping thread at said leading end being a maximum radius which substantially decreases behind said leading end until said trailing end is reached to thereby provide a self-tapping fastener that accommodates the chips created by the cutting area of the self-tapping threads that requires less torque to turn due to the substantial relief of the radius behind the cutting end of the self-tapping threads.

6. The self-tapping bolt of claim 5 wherein:
said slot are two in number spaced on opposite sides of said tapered self-tapping end.

7. The self-tapping bolt of claim 6 wherein:
said threads on said tapered self-tapping end are approximately five in number.

8. The self-tapping bolt of claim 7 wherein:
said second end is in the form of a hexagonal bolt head.

9. The self-tapping bolt of claim 6 wherein:
said threads on said tapered self-tapping end are between four and six.

10. The self-tapping bolt of claim 9 wherein:
said tapered self-tapping end has a bevel angle of approximately seven degrees.

11. The self-tapping bolt of claim 10 wherein:
said slots have a slot angle from approximately twenty six degrees as measured from the axis of said shank to approximately thirty seven degrees.

12. The self-tapping bolt of claim 6 wherein:
said bottom of said slot has one end near the center of said outermost first end.

* * * * *